United States Patent
Takiguchi et al.

[11] Patent Number: 6,007,456
[45] Date of Patent: Dec. 28, 1999

[54] SELECT-SHOCK CONTROL APPARATUS AND METHOD FOR VEHICULAR AUTOMATIC TRANSMISSION

[75] Inventors: Masahiro Takiguchi; Yoshifumi Fujita, both of Shizuoka, Japan

[73] Assignee: Jatco Corporation, Fuji, Japan

[21] Appl. No.: 09/070,816

[22] Filed: May 1, 1998

[30] Foreign Application Priority Data

May 14, 1997 [JP] Japan ................................. 9-124211

[51] Int. Cl.[6] .................................................. F16H 61/08
[52] U.S. Cl. .......................................... 477/117; 475/128
[58] Field of Search ........................... 477/117; 475/128, 475/129

[56] References Cited

U.S. PATENT DOCUMENTS

| | | | |
|---|---|---|---|
| 3,038,575 | 6/1962 | Hansen | 192/85 |
| 3,730,022 | 5/1973 | O'Malley | 74/759 |
| 3,776,066 | 12/1973 | Piret | 74/763 |
| 4,226,319 | 10/1980 | Euler et al. | 192/85 |
| 4,400,998 | 8/1983 | Bookout et al. | 74/740 |
| 4,440,282 | 4/1984 | Ishimaru et al. | 192/70.2 |
| 4,732,253 | 3/1988 | Hiramatsu et al. | 192/87.11 |
| 4,753,132 | 6/1988 | Sumiya et al. | 74/753 |
| 4,811,628 | 3/1989 | Winkam et al. | 74/10.5 |
| 4,836,052 | 6/1989 | Iwanaga et al. | 74/759 |
| 4,994,006 | 2/1991 | Kinoshita et al. | 475/286 |
| 5,029,685 | 7/1991 | Takase et al. | 192/48.91 |
| 5,090,270 | 2/1992 | Suzuki | 477/117 |
| 5,107,723 | 4/1992 | Yamashita et al. | 477/117 |
| 5,232,411 | 8/1993 | Hayashi et al. | 475/146 |
| 5,505,672 | 4/1996 | Sakai et al. | 477/117 |
| 5,558,598 | 9/1996 | Torimoto | 477/110 |
| 5,583,768 | 12/1996 | Hamajima et al. | 477/117 |
| 5,613,921 | 3/1997 | Sugiyama et al. | 477/125 |
| 5,643,124 | 7/1997 | Sugiyama et al. | 475/123 |
| 5,720,694 | 2/1998 | Jang | 477/117 |
| 5,860,886 | 1/1999 | Kim | 475/128 |

FOREIGN PATENT DOCUMENTS

62-288753  12/1987  Japan .

Primary Examiner—Dirk Wright
Attorney, Agent, or Firm—Foley & Lardner

[57] ABSTRACT

In select-shock control apparatus and method for a vehicular automatic transmission, the automatic transmission having a friction element to be released when a range selection from a vehicular running range to a neutral range occurs, a determination is made whether the range selection from the vehicular running range to the neutral range occurs; a transient hydraulic pressure control is performed such that a hydraulic pressure drawn out from the friction element is reduced up to a pressure level such as not to generate a shock which would occur in the vehicle when the range selection occurs, the level of the drawn out hydraulic pressure is maintained for a time duration at an end of which no vehicular running torque is left in the friction element, and, thereafter, an engagement torque developed on the friction element is drawn out at a dash when determining that the range selection from the vehicular running range to the neutral range occurs.

12 Claims, 9 Drawing Sheets

|  | REV/C | HIGH/C | 2-4/B | LOW/C | L&R/B | LOW O.W.C |
|---|---|---|---|---|---|---|
| 1st |  |  |  | ○ | ◌ | ◍ |
| 2nd |  |  | ○ | ○ |  |  |
| 3rd |  | ○ |  | ○ |  |  |
| 4th |  | ○ | ○ |  |  |  |
| Rev. | ○ |  |  |  | ○ |  |

| SOLENOID<br>GEAR SHIFT<br>RANGE POSITION | SHIFT SOLENOID (A) | SHIFT SOLENOID (B) |
|---|---|---|
| 1st RANGE | ○ | ○ |
| 2nd RANGE | × | ○ |
| 3rd RANGE | × | × |
| 4th RANGE | ○ | × |

{ ○ ····· ON (DRAIN CIRCUIT CLOSED STATE)
  × ····· OFF (DRAIN CIRCUIT OPEN STATE) }

(OIL TEMPERATURE)

FIG.7B (ENGINE REVOLUTION SPEED)

SELECT-SHOCK CONTROL APPARATUS AND METHOD FOR VEHICULAR AUTOMATIC TRANSMISSION

BACKGROUND OF THE INVENTION a) Field of the Invention

The present invention relates to select-shock control apparatus and method for a vehicular automatic transmission in which a transient hydraulic pressure of a clutching element is released when a selector lever is shifted from a vehicular running range such as a drive (D) range to a neutral (N) range.

b) Description of the Related Art

In each of conventional vehicular automatic transmissions, a clutching hydraulic pressure has only been drained from a clutching element to be released when a selector lever is shifted from a vehicular running range such as a drive (D) range to a neutral (N) range and no transient hydraulic pressure control is particularly performed.

SUMMARY OF THE INVENTION

Hence, in each of the conventional vehicular automatic transmissions, an engagement torque of the clutching element to be released when the range selection from the vehicular running range (for example, the drive (D) range) to the neutral (N) range occurs is discharged instantaneously (for example, a working oil temperature is high) or discharged slowly (for example, the working oil temperature is low).

Suppose that the engagement torque of a low clutch L/C to be released when the gear shift speed range is selected from the D range to the N range is discharged immediately.

In this case, when the engagement capacity of the low clutch L/C becomes nullified immediately after the range selection from D to N range occurs due to the instantaneous discharged of a low clutch pressure PL/C, a turbine speed $N_T$ of a turbine is raised abruptly, a driving torque TQ is varied in a vibration manner, and a shock (a jolt) of a fluctuation back (aftershock) including a vehicular suspension system (hereinafter, also simply referred to as a selection shock) appears remarkably.

That is to say, since a vehicular suspension torque which causes compression and torsion of suspension springs is discharged instantaneously, the vehicle is jolted in forward and backward directions or in upward and downward directions of the vehicle.

Next, suppose that the engagement torque of the low clutch L/C to be released when the range selection from the D range to the N range occurs is discharged slowly. In this case, the engagement capacity of the low clutch L/C is sustained for a while after the range selection from D to N range occurs due to a slow discharged of the low clutch pressure PL/C.

Hence, due to a moderate rise in a turbine speed, the above-described selection shock does not appear but a forwarding torque remains even at the N range so that the vehicle can creep.

It is therefore an object of the present invention to provide select-shock control apparatus and method for a vehicular automatic transmission which can simultaneously achieve both of a prevention of the select-shock from occurring and of a prevention of the vehicular running even in the N range from occurring.

The above-described object can be achieved by providing a select-shock control apparatus for a vehicular automatic transmission, comprising:

a range selection determinator for determining whether a range change from a vehicular running range to a neutral range occurs;

a friction element to be released when the range selection from the vehicular running range to the neutral range occurs; and a controller for performing a transient hydraulic pressure control such that a hydraulic pressure discharged from the friction element is reduced up to a pressure level such as not to generate a shock which would occur in the vehicle when the range selection occurs, the level of the discharged hydraulic pressure is maintained for a time duration at an end of which no vehicular running torque is left in the friction element, and, thereafter, an engagement torque developed on the friction element is discharged as a step function when the range selection determinator determines that the range selection from the vehicular running range to the neutral range occurs.

The above-described object can also be achieved by providing a select-shock control method for a vehicular automatic transmission, the automatic transmission having a friction element to be released when a range selection from a vehicular running range to a neutral range occurs, the method comprising the steps of:

determining whether the range selection from the vehicular running range to the neutral range occurs;

performing a transient hydraulic pressure control such that a hydraulic pressure discharged from the friction element is reduced up to a pressure level such as not to generate a shock which would occur in the vehicle when the range selection occurs, the level of the drawn out hydraulic pressure is maintained for a time duration at an end of which no vehicular running torque is left in the friction element, and, thereafter, an engagement torque developed on the friction element is discharged as a step function when determining that the range selection from the vehicular running range to the neutral range occurs.

BEST MODE FOR CARRYING OUT THE INVENTION

Reference will hereinafter be made to the drawings in order to facilitate a better understanding of the present invention.

First Embodiment

Figure 1:
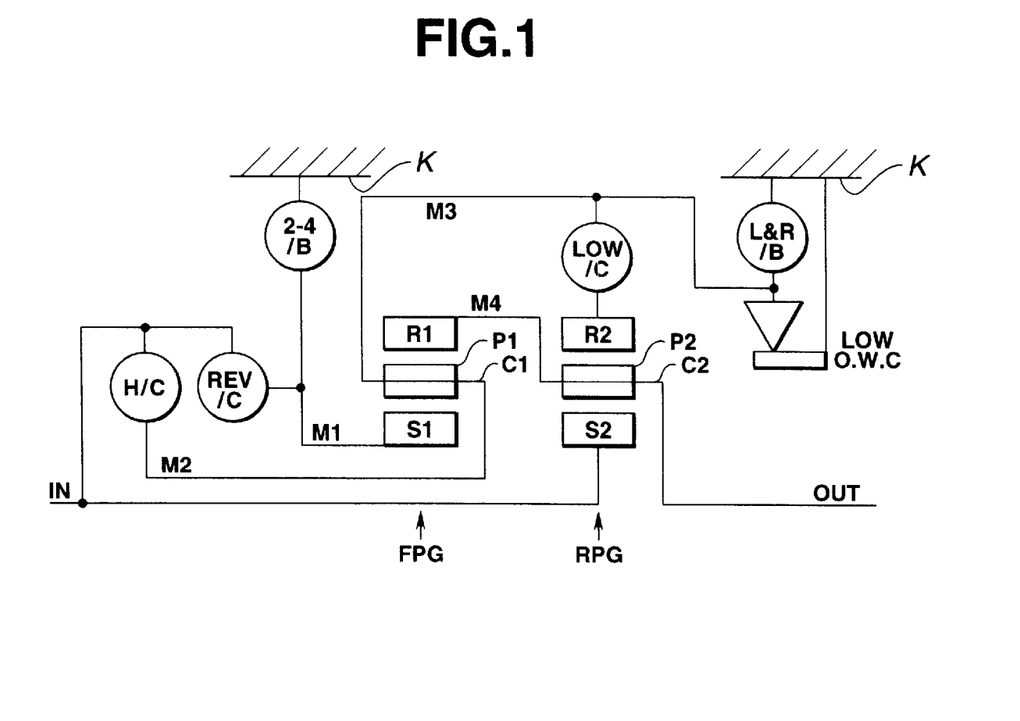
FIG. 1 is a skeleton view of a power transmission mechanism of a vehicular automatic transmission to which a select-shock control apparatus in a first preferred embodiment according to the present invention is applicable.

FIG. 1 shows a skeleton view of a power transmission mechanism of an automatic transmission to which a select-shock control apparatus in a first preferred embodiment according to the present invention is applicable.

In FIG. 1, IN denotes an input shaft, OUT denotes an output shaft, FPG denotes a front planetary gear.

The first planetary gear includes: a first sun gear S1; a first ring gear R1; a first pinion P1; and a first pinion carrier C1.

The rear planetary gear RPG includes: a second sun gear S2; a second ring gear R2; a second pinion P2; and a second pinion carrier C2.

Friction elements for providing a gear shift range of a forward fourth-speed and backward first-speed using the above-described gear train include: a reverse clutch REV/C (hereinafter, R/C); a high clutch HIGH/C (hereinafter, H/C); 2–4 brake 2–4/B, a low clutch LOW/C (hereinafter, L/C), a low and reverse brake L & R/B, and a low one-way clutch LOW (hereinafter, abbreviated as LOW O.W.C).

The first sun gear S1 is linked to the input shaft IN via a first rotatable member M1 and the reverse clutch R/C and is connected to a casing K via the first rotatable member M1 and 2–4 brake 2–4/B.

The first carrier C1 is connected to the input shaft IN via a second rotatable member M2 and a high clutch H/C and is connected to the casing K via a third rotatable member M3 and low and reverse brake L & R/B.

In addition, the first carrier C1 is connected to a second ring gear R2 via a third rotatable member M3 and a low clutch L/C.

It is noted that the low one-way clutch LOW O.W.C. is juxtaposed to the low and reverse brake L & R/B.

The first ring gear R1 is uninteruptedly (directly) coupled to the second carrier C2 via a fourth rotatable member M4. An output shaft OUT is uninterruptedly coupled to the second carrier C2.

The second sun gear S2 is uninterruptedly coupled to the input shaft IN.

It is noted that a feature of the power transmission mechanism is that a one-way clutch adopted to achieve a gear shift timing without a gear shift shock during a downshift operation from a fourth-speed to a third-speed and a hydraulic actuated clutch to secure an engine braking along with an adoption of the one-way clutch are abolished so that the number of the frictional elements are reduced, thereby a small sizing and light weight automatic transmission being achieved.

Figure 2:
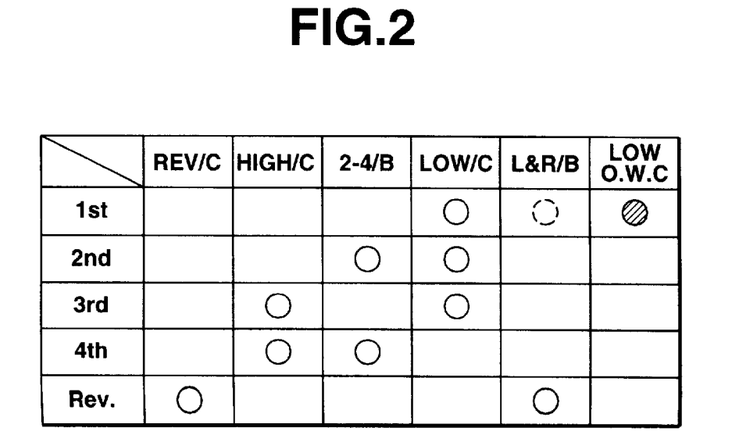
FIG. 2 is a table of an engagement logic of the vehicular automatic transmission to which the select-shock control apparatus in the first embodiment is applicable.

FIG. 2 shows engagement and disengagement logic table achieving the gear ratios of the forward four speed range and backward range by means of the power transmission mechanism described above.

A first gear (1st) can be achieved by a combination of an application of the low clutch L/C with that of the low and reverse brake L & R/B (when an engine braking range is selected) or with a mechanical locking of the low one-way clutch LOW O.W.C. That is to say, the second sun gear input, the second ring gear fixed, and the second carrier output are entered.

The second gear (2nd) can be achieved by the application of the low clutch L/C and 2–4 (2nd gear-4th gear) brake (2–4/B).

That is to say, the second sun gear input, the first sun gear fixed, and the second carrier output are entered.

The third gear (3rd) can be achieved according to the application of the high clutch H/C and low clutch L/C. That is to say, a simultaneous input of the second ring gear and the second sun gear and an output of the second carrier occur (gear ratio=1).

The fourth gear (4th) can be achieved according to the application of the high clutch H/C and 2–4 brake 2–4/B. That is to say, the first carrier and second sun gear input, the first sun gear fixed, and the second carrier output occur so as to provide an overdrive gear ratio.

The backward gear (Rev) can be achieved by the application of the reverse clutch (REV/C) and the low reverse brake (L&R/B).

That is to say, the first and second sun gear input, the first carrier fixed, and the second carrier output are entered.

It is noted that the 2–4 brake 2–4/B takes a form of a multiple-plate brake structure.

Figure 3A:
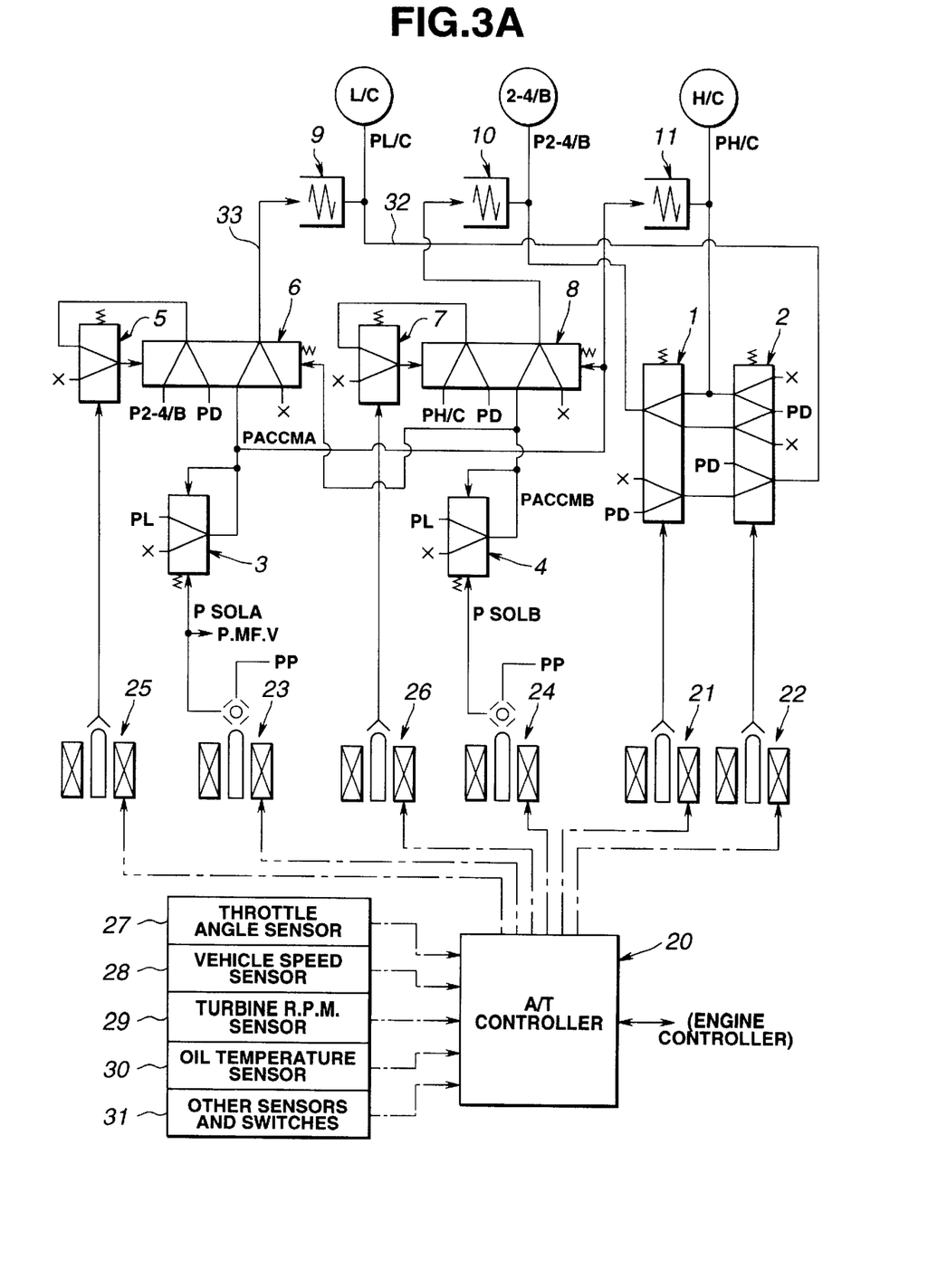
FIGS. 3A and 3B are circuit block diagrams of a hydraulic pressure control section and an electronic control section of the vehicular automatic transmission to which the select-shock control apparatus in the first embodiment is applicable.
Figure 3B:
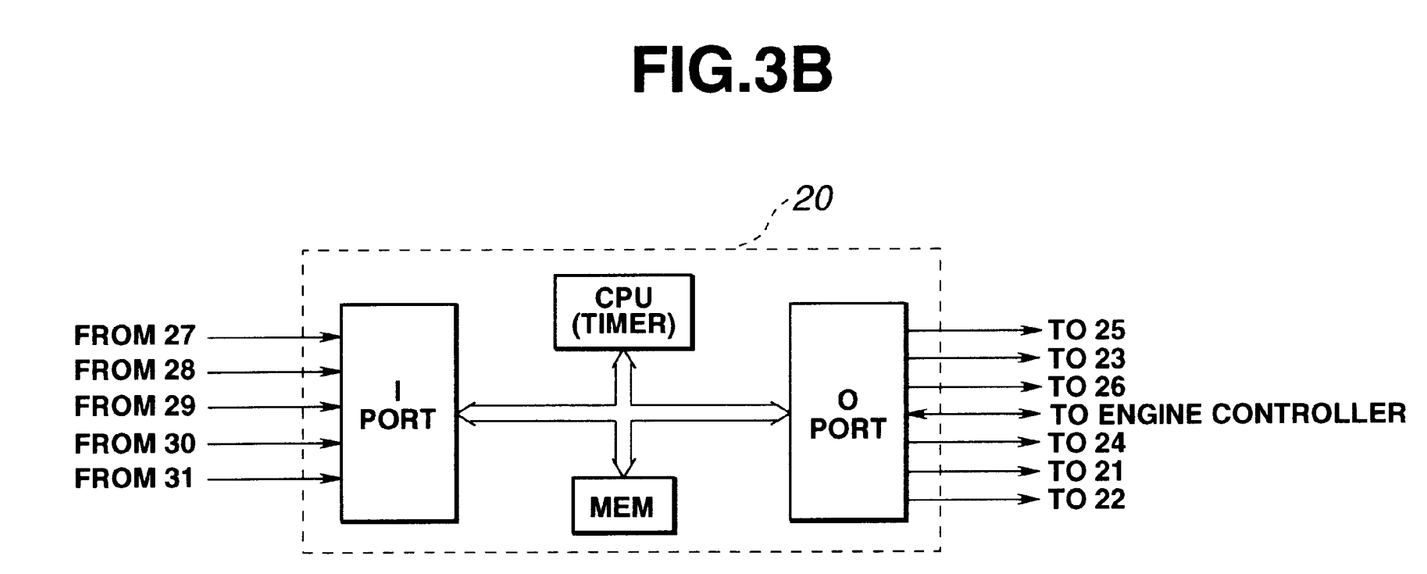

FIGS. 3A and 3B show a system block diagram of the friction element, the control valve portion, and an electronic controller for achieving the automatic gear shift of D range (1st speed to fourth speed) from among the ranges.

In FIG. 3A, the low clutch L/C, the 2–4 brake 2–4/B, and the high clutch H/C are installed as the friction elements.

The low clutch L/C corresponds to the friction element.

A control valve portion shown in FIG. 3A includes: a shift valve (A) 1; a shift valve (B) 2; an accumulation control valve (A) 3; an accumulation control valve (B) 4; a low clutch timing valve 5; a low clutch sequence valve 6; a 2–4 brake timing valve 7; a 2–4 brake sequence valve 8; a low clutch accumulator 9; a 2–4 brake accumulator 10; and a high clutch accumulator 11. The low clutch accumulator 9 corresponds to an accumulator.

The shift valve (A) 1 and the shift valve (B) 2 carry out hydraulic passage switchings at each gear shift from the first speed to the fourth speed (overdrive: OD) according to actuations of shift solenoids (A) 21 and (B) 22, respectively.

The accumulation control valve (A) 3 serves to reduce pressure in a line pressure PL according to a magnitude of a solenoid pressure PSOLA created by a line pressure duty solenoid 23 so as to adjust an accumulation control pressure (A) PACCMA.

It is noted that a solenoid pressure PSOLA created by means of a line pressure solenoid 23 is introduced into a pressure modifier valve (P.MF.V) which serves to adjust a modifier pressure which acts as a signal pressure of a line pressure PL created by means of a pressure regulator valve (not shown).

The accumulation control valve (B) 4 reduces the line pressure PL according to the magnitude of the solenoid pressure PSOLB created by the 2–4/B duty ratio solenoid 24 so as to adjust the accumulation control pressure (B) PACCMB.

The low clutch timing valve 5 is a switching valve which switches a hydraulic passage of the signal pressure into a drain side when the low clutch timing solenoid 25 is turned to OFF and into a hydraulic pressure communication side due to a development in the hydraulic pressure when the low clutch timing solenoid 25 is turned ON.

The low clutch sequence valve 6 carries out a back pressure control against a low clutch accumulator 9 when the up-shift from a lower gear to the fourth speed occurs or when the down-shift from the fourth gear to the lower gear occurs.

The 2–4 brake timing valve 7 is a switching valve which switches the hydraulic passage of the signal pressure into the draining side when the 2–4 brake timing solenoid 26 is turned in the OFF state and which switches the hydraulic passage of the signal pressure into the drain side when the 2–4 brake timing solenoid 24 is turned to OFF and switches the hydraulic passage of the signal pressure due to the development in the hydraulic pressure into the communication side when the 2–4 brake timing solenoid 26 is turned to OFF.

The 2–4 brake sequence valve 8 carries out the back pressure control of the 2–4 brake accumulator 10 when the up-shift from a lower speed to the third speed or when the down-shift from the third speed to the lower speed occurs.

The low clutch accumulator 9 has the backing pressure chamber into which the accumulation control pressure (A)PACCMA is introduced via the low clutch sequence valve 6 so as to make the clutch and release of the low clutch L/C smooth.

In FIGS. 3A, 32 denotes a hydraulic passage (PL/C) linked to the low clutch L/C and 33 denotes a back pressure hydraulic passage linked to the low clutch accumulator 9.

An electronic control portion in FIG. 3A includes: a plurality of actuators controlling respectively corresponding hydraulic pressures in response to drive commands from an A/T controller 20 (Automatic Transmission Controller). The actuators include: the shift solenoid (B) 22; the line pressure duty ratio solenoid 23; the 2–4/B duty ratio solenoid 24; the low clutch timing solenoid 25; and 2–4/B timing solenoid 26.

FIG. 3B shows the A/T controller 20 having a microcomputer including a CPU, a ROM, a RAM, an Input port, an Output port, and a common bus.

The controller 20 receives an output signal indicating an opening angle of an engine throttle valve from a throttle angle sensor 27, an output signal indicating a vehicle speed from a vehicle speed sensor 28, an output signal indicating a speed of a turbine from a turbine, an oil temperature of the working oil from an oil temperature sensor 30; and other sensors and switches 31.

The back pressure control of the low clutch accumulator 9 is started when the A/T controller 20 determines in response to a switch on signal of an inhibitor switch that the range selection from a vehicular running range (for example, D (Drive) range or R (Reverse) range) to a neutral range (N) occurs.

That is to say, in response to a duty ratio command from the A/T controller 20 to the line pressure duty ratio solenoid 23, the accumulation control valve 3 controls the accumulation control pressure (A)PACCMA introduced into the back pressure chamber of the low clutch accumulator 9.

Figure 4:
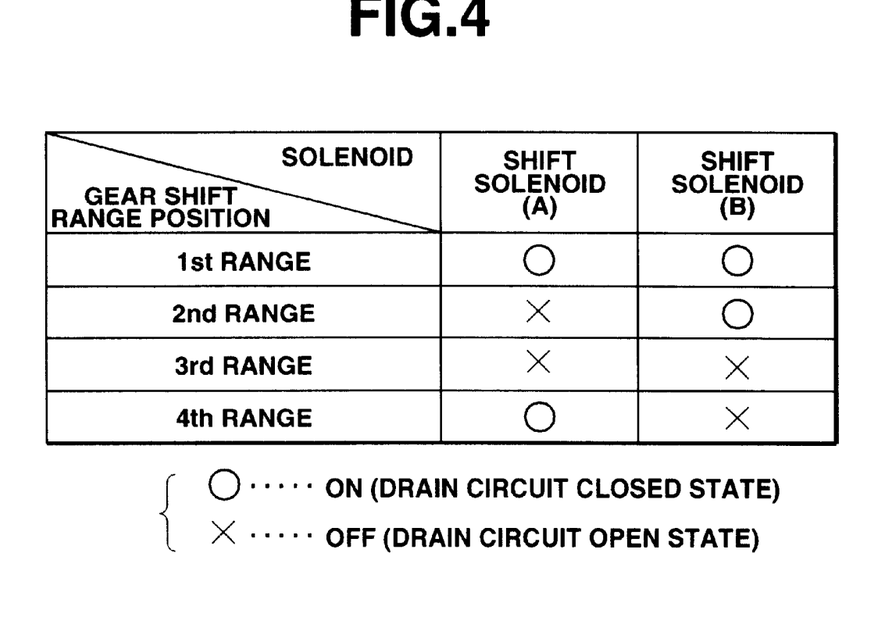
FIG. 4 is a table representing operations and non-operations of shift solenoids in the select-shock control apparatus in the first embodiment.

In addition, the gear shift control which automatically carries out the first speed to the fourth speed during the D (Drive) range in the automatic transmission is carried out as shown in FIG. 4.

Figure 5:
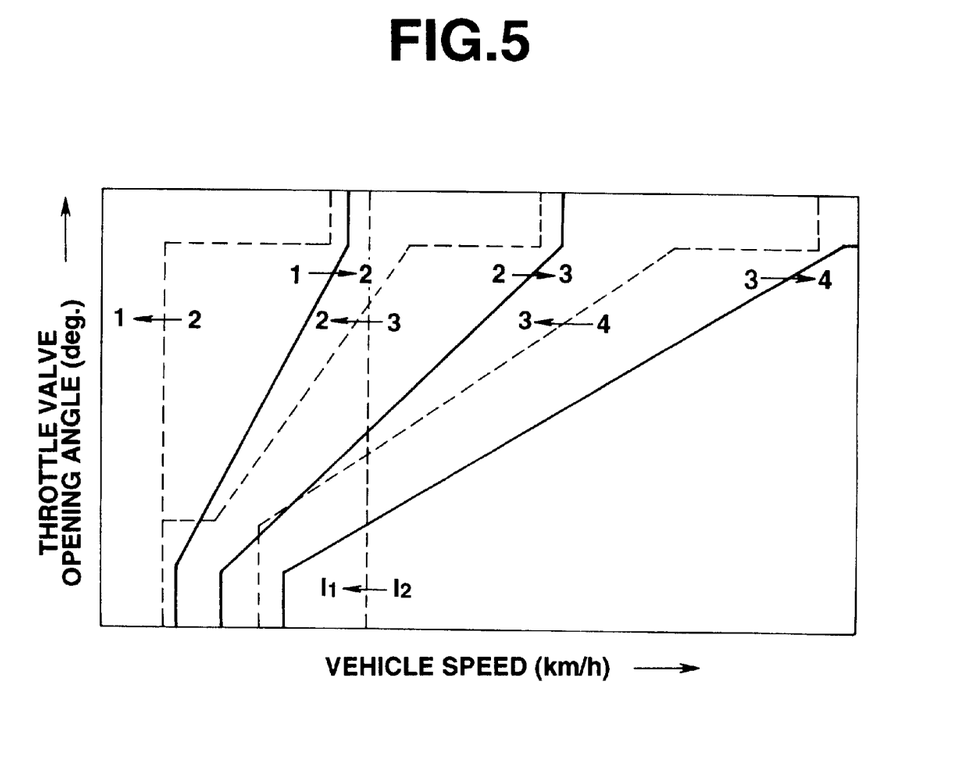
FIG. 5 is a view representing one example of gear shift point characteristic model in the vehicular automatic transmission to which the select-shock control apparatus is applicable.

FIG. 5 shows a gear shift point characteristic model view.

The gear shift control is carried out when an intersection point at which the opening angle of the engine throttle valve and the vehicle speed are intersected transverses occurs the up-shift line or the down-shift line, the gear shift command is issued. According to the gear shift command, the gear ratio is determined which is transferred next in response to the gear shift command.

To obtain the determined gear ratio, the A/T controller 20 issues the ON or OFF command to the shift solenoid (A) 21 and the shift solenoid (B) 22 from the A/T controller 20 in accordance with a shift solenoid operation table shown in FIG. 4.

Next, an operation of the range controller according to the present invention will be described below.

[Range selection control operation]

Figure 6:
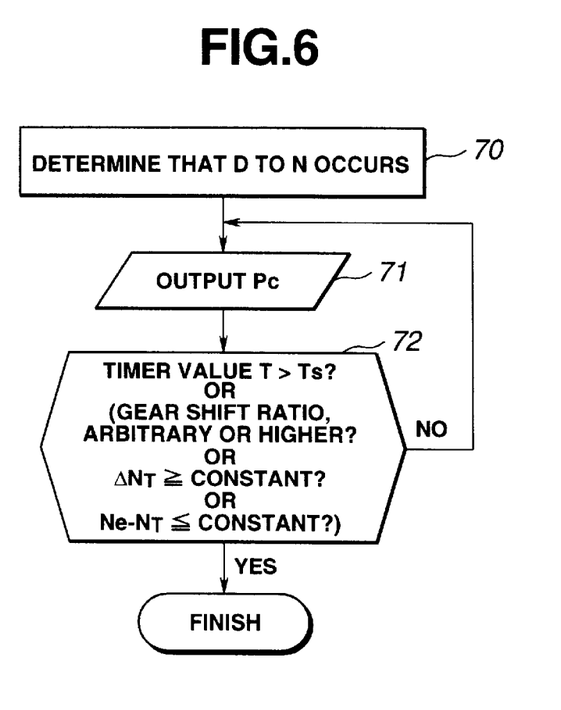
FIG. 6 is an operational flowchart representing a range selection control flow of controlling a back pressure of an accumulator of a low clutch L/C released when the gear shift speed range selection from a D range to an N range occurs in the case of the first embodiment.

FIG. 6 shows a flowchart representing a flow of a range selection operation which, in response to a command from the A/T controller 20, controls the back pressure of the accumulator in the low clutch L/C released when the range selection from the D range to the N range is carried out.

At a step 70 in FIG. 7, the CPU of the A/T controller 20 determines, in response to a switch signal form an inhibitor switch, a selection operation by a vehicle driver through a selector lever from a drive range (D) to a neutral range (N) and starts the select-shock control according to the selection determination at the step 70.

At the subsequent step 71, a duty ratio command is outputted from the A/T controller 20 to the line pressure duty solenoid 23, the duty ratio command being set so that the accumulation control pressure (A) PACCMA introduced into the back pressure chamber of the low clutch accumulator 9 is the set pressure Pc.

Figure 7A:
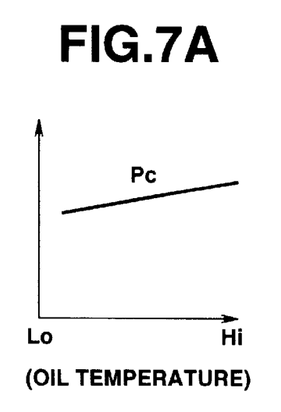
FIGS. 7A, 7B, and 7C are characteristic graphs of a set hydraulic pressure Pc with respect to an oil temperature, an engine speed, a slip speed of a torque converter in a case when the set hydraulic pressure Pc shown in FIG. 6 is varied.
Figure 7B:
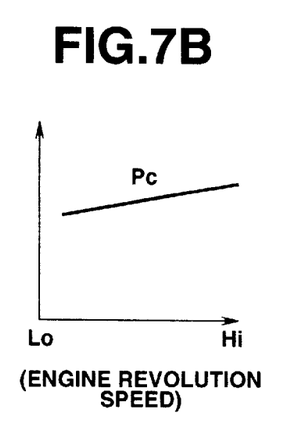
Figure 7C:
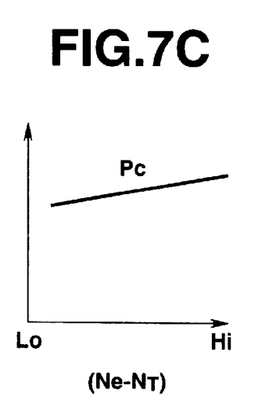

The set pressure Pc may be fixed to a predetermined fixed value. Alternatively, as shown in FIG. 7A, the set pressure Pc may be varied according to the oil temperature detected by the oil temperature sensor 30. Alternatively, as shown in FIG. 7B, the set pressure Pc may be varied according to an engine speed Ne of the associated engine derived from the engine controller connected to the A/T controller 20. Alternatively, as shown in FIG. 7C, the set pressure Pc may be varied according to a slip speed which is a difference between the engine speed Ne and the turbine speed $N_T$. Furthermore, the set pressure Pc may be varied according to any two or all of the three parameters of the oil temperature, the engine speed, and ($Ne-N_T$).

It is noted that the set pressure Pc is set higher as each of the values becomes higher, the values being the oil temperature, the engine speed, and the torque converter slip speed (Ne−$N_T$) in order to maintain a speed at which the low clutch L/C slips constant after the range selection to the N range regardless of the different driving condition.

At a step 72, the CPU of the A/T controller 20 determines whether a timer value T activated when the selection of D to N range is carried out at the step 70 has reached to the set time duration Ts at the step 72. If so, the select-shock control is ended.

It is noted that the set time duration Ts is previously set to a time duration at an end of which a vehicular running torque is not left while preventing an occurrence of a shock during the range change to the N range.

Although the select-shock control is ended through the timer value measurement, when a gear ratio of the automatic transmission equals or exceeds an arbitrary set gear ratio, the select-shock control may be ended. Or alternatively, the select-shock control may be ended when a variation width ΔNT of the turbine (refer to ΔNT in FIG. 8E) equals or exceeds a set width. Alternatively, the select-shock control may be ended when the difference between the engine speed Ne and the turbine speed $N_T$, i.e., the slip speed of the torque converter is equal to or below a set speed.

[Control action by means of the select-shock control described above]

FIGS. 8A through 8E integrally show a timing chart for explaining respective characteristics of the accumulation control pressure (A)PACCMA, the low clutch pressure PL/C, the drive torque TQ, the engine speed Ne, and the turbine speed $N_T$ when the select-shock control such that the back pressure control of the accumulator in the low clutch L/C released when the range change from D to N range occurs.

Figure 8A:
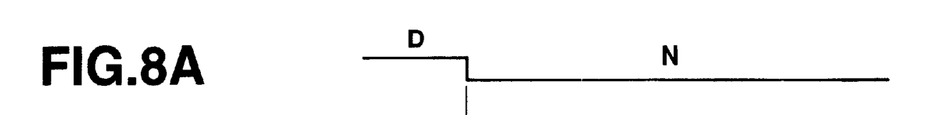
FIGS. 8A, 8B, 8C, 8D, and 8E are integrally a timing chart representing each characteristic of an accumulation control pressure (A) PACCMA, a low clutch pressure PL/C, a driving torque TQ, an engine speed Ne, and a turbine speed $N_T$ in the case of the first embodiment.
Figure 8B:
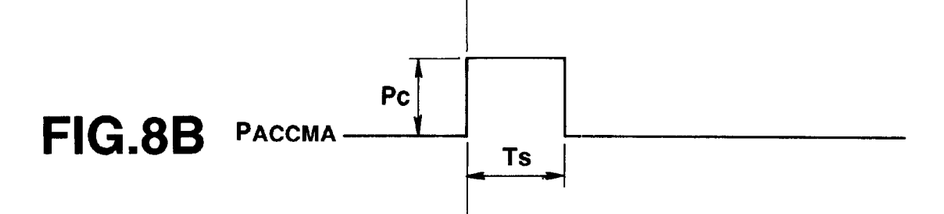

First, as shown in FIGS. 8A and 8B, when the gear shift speed range change from D to N range occurs, the accumulation control pressure (A) PACCMA, i.e., the back pressure of the accumulator in the low clutch L/C is set to the set pressure Pc only during the set time duration Ts in order to carry out a transient hydraulic pressure control such that the drain pressure of the low clutch L/C is reduced to a pressure level not generating the shock occurring during the range selection, is maintained for the set time duration Ts until the running torque is not left, and the engagement torque is at once drained.

Figure 8C:
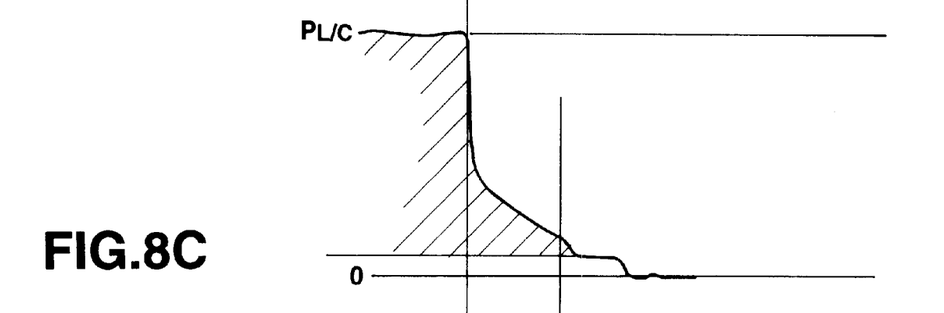

The low clutch pressure PL/C indicates, as shown in FIG. 8C, a characteristic such that the hydraulic pressure is reduced at a torque releasing speed so as not to generate the select-shock.

Figure 8D:
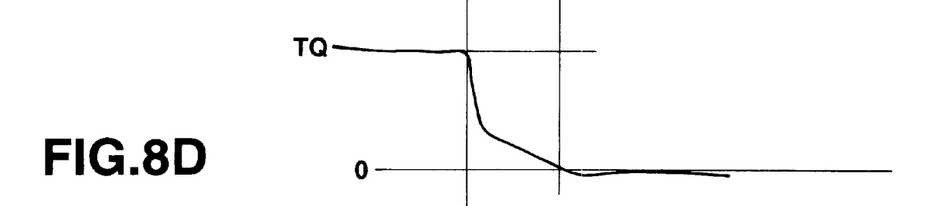

The driving torque TQ indicates, as shown in FIG. 8D, a characteristic such that immediately after the range change from D to N range occurs, the driving torque is reduced abruptly at a relatively large gradient and, thereafter, the driving torque is converged to zero at a relatively moderate gradient due to the control such that the back pressure of the accumulator in the low clutch L/C is drained as described above. That is to say, the driving torque TQ is not largely varied in a vibration manner and varied without hunting as compared with that described in the BACKGROUND OF THE INVENTION so that the select-shock occurring the range selection from D to N range is prevented. In addition, the driving torque TQ is converged finally to zero at a time when the set time duration Ts is ended so that the vehicular forwarding torque is not developed at that time as compared with the driving torque characteristic described in the BACKGROUND OF THE INVENTION.

Figure 8E:
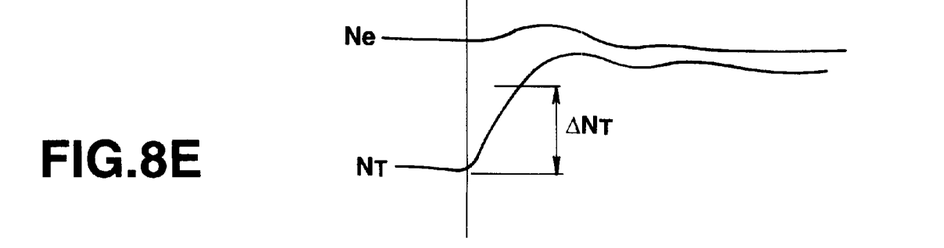

The engine revolution speed Ne indicates, as shown in an upper part of FIG. 8E, such a characteristic that a variation of the engine speed is relatively small before and after the range selection from D to N range occurs.

The turbine speed $N_T$ indicates, as shown in a lower part of FIG. 8E, a characteristic such that the turbine speed $N_T$ is varied after the range selection has occurred and is controlled at an optimum gradient without the select-shock due to the hydraulic pressure control for the back pressure of accumulator in the low clutch L/C.

Since the range selection hydraulic pressure controller carries out such a transient hydraulic pressure control that the draining hydraulic pressure of the low clutch is reduced up to the pressure level such as not to develop the select-shock, the draining hydraulic pressure is maintained until the time at which the vehicular running torque is not left, and, thereafter, the engagement torque of the low clutch L/C is drained at once, and the select-shock can be prevented from occurring and the vehicular run in the N range can also be prevented from occurring.

Since the hydraulic pressure control during the range selection from D to N range is the control for the back pressure of the accumulator such that the back pressure of the accumulator in the low clutch L/C is temporarily increased after the determination of the range selection from D to N range, the hydraulic pressure control during the range selection from D to N range can be simple, more precise, and highly accurate as compared with a direct control for the draining hydraulic pressure from the low clutch L/C through the hydraulic pressure in the oil passage 32 for the low clutch pressure.

Since the back pressure Pc of the accumulator which determines the draining hydraulic pressure in the hydraulic pressure control during the range selection is set according to at least one of the driving conditions of the oil temperature, the engine speed Ne, and the slip speed of the torque converter, stable preventions of the select-shock and of the vehicular run in the N range can be achieved.

Second Embodiment

Figure 9:
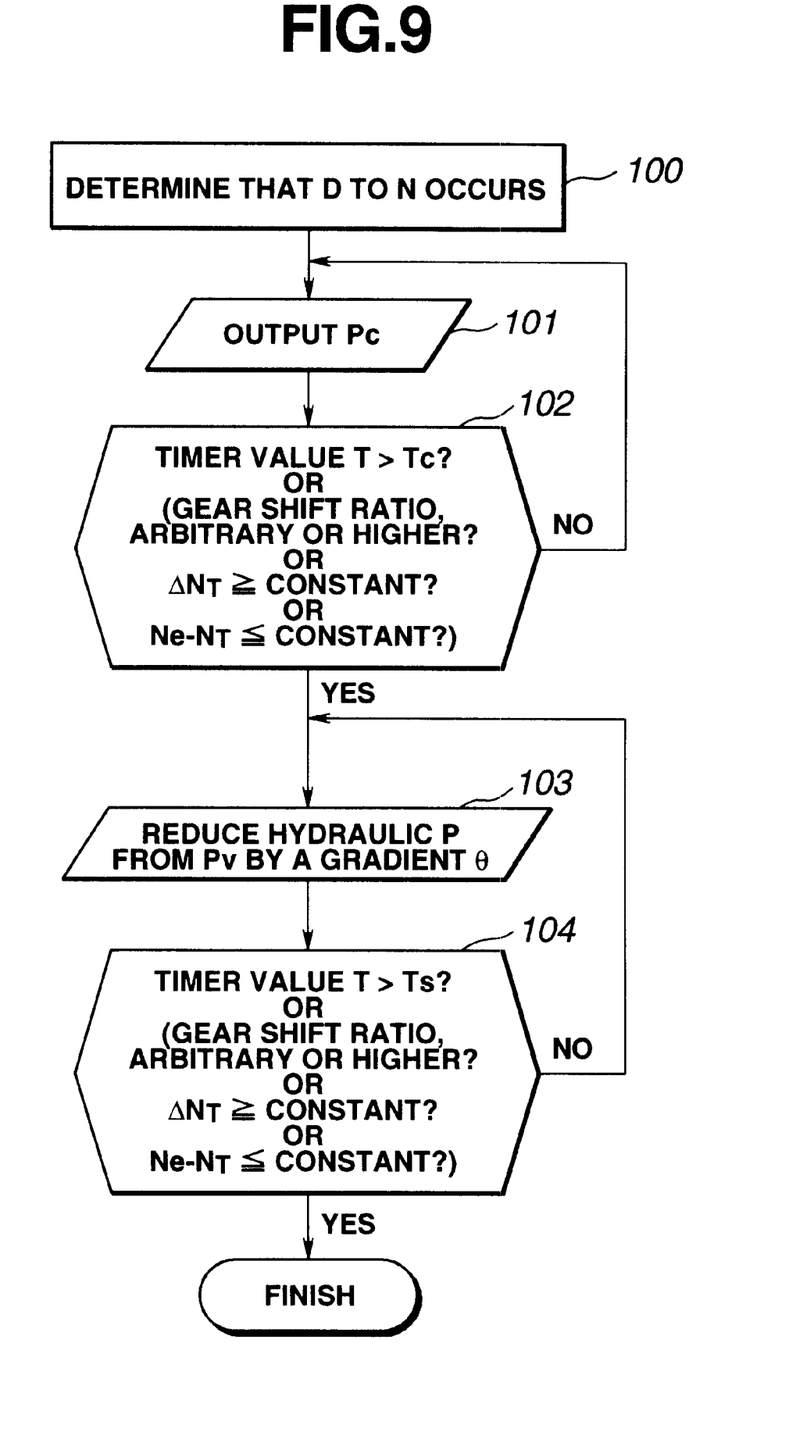
FIG. 9 is an operational flowchart representing a range selection control flow of controlling a back pressure of an accumulator of a low clutch L/C released when the range selection from a D range to an N range occurs in the case of the second embodiment of the select-shock control apparatus according to the present invention.

FIG. 9 shows a flowchart for explaining the select-shock control operation in a case of a second preferred embodiment of the select-shock control apparatus according to the present invention.

At a step 100, the CPU of the A/T controller 20 determines in response to the switch on signal from the inhibitor switch that the range selection from D range to N range occurs so that the select-shock control is started.

At a step 101, the CPU of the A/T controller 20 outputs the duty ratio command to the line pressure duty solenoid 23, the duty solenoid 23, the accumulation control pressure (A) PACCMA introduced into the back pressure chamber of the low clutch accumulator 9 being set to the first set pressure (Pc) in response to the duty ratio command described above.

At a step 102, the CPU of the A/T controller 20 determines whether the value of the timer T activated when the range selection occurs has reached to the set time duration (Tc).

If the value of the timer T has reached to the set time duration Tc at the step 102, the routine goes to a step 103.

At the step 103, the CPU of the A/T controller 20 sets the accumulation control pressure (A) PACCMA introduced into the back pressure chamber of the low clutch accumulator 9 to a second set pressure Pv (>Pc). Thereafter, the CPU of the A/T controller 20 outputs the subsequent duty ratio command to the line pressure duty solenoid 23, the subsequent duty ratio command being outputted to gradually reduce the accumulation control pressure (A) PACCMA at a gradient θ.

At a step 104, the CPU of the A/T controller 20 determines whether the value of the timer T activated when the range selection from D to N range occurs has reached to the set time duration $T_Q$.

If T>Ts (Yes) at the step 104, the routine shown in FIG. 9 is ended.

Figure 10A:
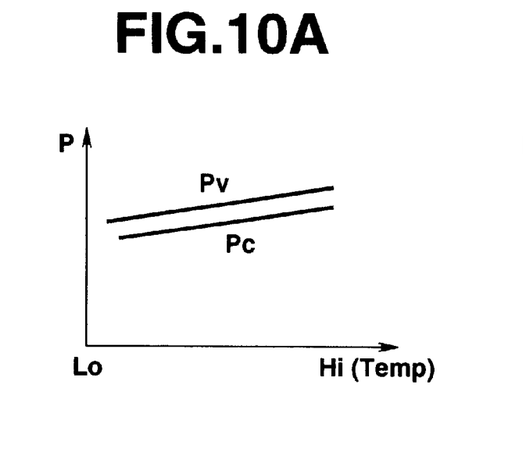
FIGS. 10A, 10B, 10C, 10D, and 10E are characteristic graphs representing of the set hydraulic pressures Pc and Pv with respect to the oil temperature, the engine speed, the slip speed of the torque converter in a case when the set hydraulic pressures Pc and Pv shown in FIG. 9 is varied, a gradient θ with respect to the oil temperature when the gradient θ is varied, and set time durations Tc and Ts with respect to the oil temperature when the set time durations Tc and Ts are varied.
Figure 10B:
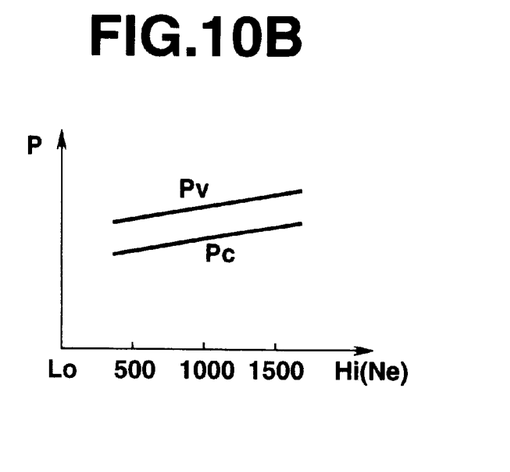
Figure 11A:
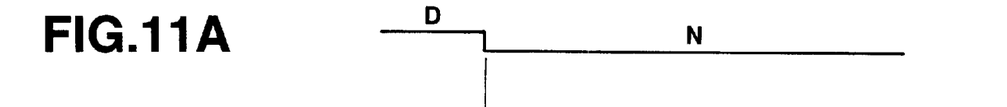
FIGS. 11A, 11B, 11C, 11D, and 11E are integrally a timing chart representing each characteristic of the accumulation control pressure (A) PACCMA, the low clutch pressure PL/C, the driving torque TQ, the engine speed Ne, and the turbine speed $N_T$ in the case of the second embodiment.
Figure 11B:
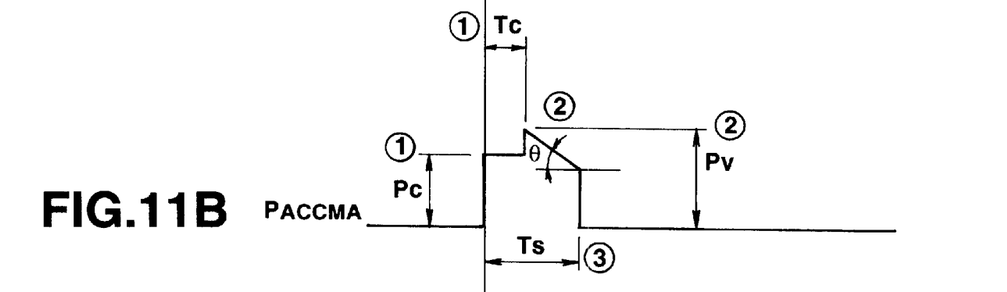

It is noted that although the first set pressure Pc and the second set pressure Pv may predetermined fixed values, both of the first and second set pressures Pc and Pv may be varied according to the level of the working oil temperature as shown in FIG. 10A. As shown in FIG. 11B, both of the first and second set pressures Pc and Pv may be varied according to the level of the engine speed. As shown in FIG. 11D, both of the first and second set pressures Pc and Pv may be varied according to the level of the slip speed of the torque converter which is the difference between the engine speed Ne and the turbine speed $N_T$. In addition, both of the first and second set pressures Pc and Pv may be varied according to the level of any one, two, or three of the driving condition parameters, i.e., the oil temperature, the engine speed, and the slip speed.

Figure 10C:
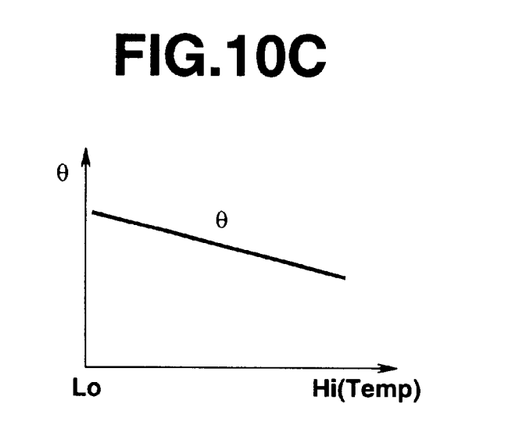
Figure 10D:
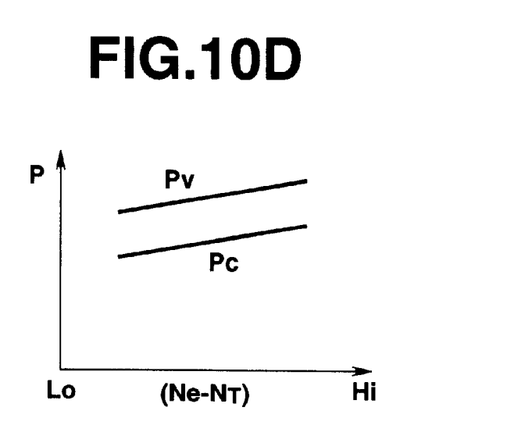

In addition, although the gradient θ may be a predetermined fixed value, the gradient θ may be varied, as shown in FIG. 10C according to the oil temperature. That is to say, the gradient θ may become small as the oil temperature becomes high.

Figure 10E:
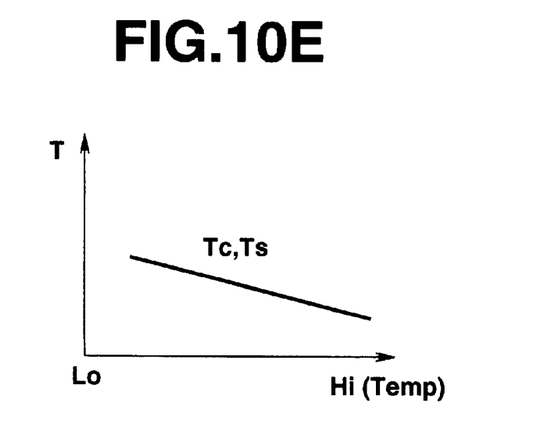

Furthermore, although the set time durations Tc and Ts may be predetermined set time durations, as shown in FIG. 10E, the set time durations Tc and Ts may be varied according to the oil temperature.

That is to say, the set time durations Tc and Ts may become shorter as the oil temperature becomes high.

[Control action as the result of execution shown in FIG. 9]

FIGS. 11A through 11E show timing charts representing respective characteristics when the select-shock control according to the back pressure control in the accumulator in the low clutch L/C released when the D-to-N range selection is carried out, the low clutch pressure PL/C, the driving torque, the engine speed, and the turbine speed $N_T$.

First, the accumulation control pressure (A) PACCMA indicates, as shown in FIG. 11B, a characteristic such that the back pressure of the accumulator of the low clutch L/C is set to the first set pressure Pc until the first set time duration Tc has passed, and, thereafter, is set to the second set pressure Pv, and is gradually reduced until the set time duration Ts had passed since the A/T controller 20 carries out the transient hydraulic pressure control, upon the determination of the D-to-N range change such that the draining hydraulic pressure of the low clutch L/C is adjusted to the hydraulic pressure not to generate the select-shock, the draining hydraulic pressure is maintained for the time duration at the end of which the vehicular running torque is not left, and, thereafter, the engagement torque of the low clutch L/C is drained (drawn out) at a dash.

It is noted that the reason that the back pressure of the accumulator is set to the first set pressure Pc in a control area denoted by ①from the time at which the selector lever is shifted from D to N range to the time at which the set time duration Tc is ended is that with the draining hydraulic pressure of the low clutch L/C released, the torque reduction and the turbine speed increase are promoted.

It is also noted that the reason that the back pressure of the accumulator is set to the second set pressure Pv in a control area denoted by ② in FIG. 11B from the time at which the set time duration Tc is ended to the time at which the set time duration Ts is ended is that, with the torque reduction and the increase in the turbine speed $N_T$ relieved, the select-shock needs to be relieved.

It is also noted that the reason that the back pressure of the accumulator is drawn out at a dash at a time point at which the set time duration Ts is ended is that the vehicular running torque is not left immediately when the turbine speed $N_T$ has reached to a value such that the select-shock becomes negligible.

The low clutch pressure PL/C indicates, as shown in FIG. 11B, a drawn-out characteristic such that an engagement capacity is temporarily increased while the torque drawn out speed is provided so as not to generate the select-shock.

Figure 11C:
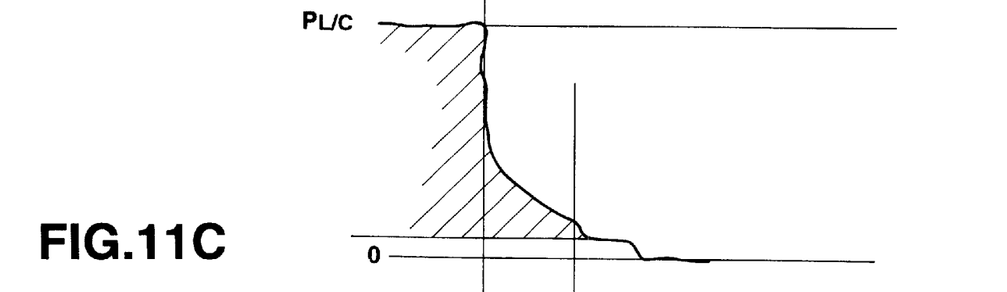
Figure 11D:
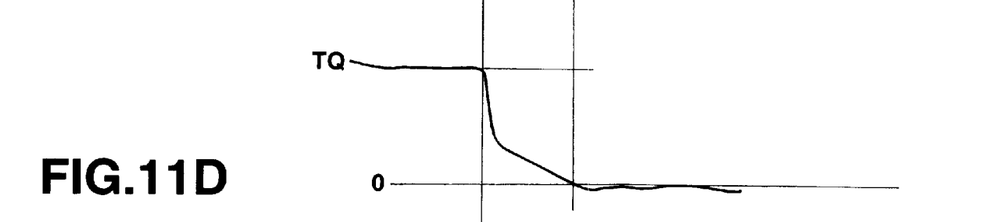

The driving torque TQ indicates a characteristic, as shown in FIG. 11C, such that the driving torque TQ is abruptly reduced immediately after the range change is reduced and is converged into the zero level due to a moderate torque reduction gradient. FIG. 11C is generally the same as described with reference to FIG. 8C.

Figure 11E:
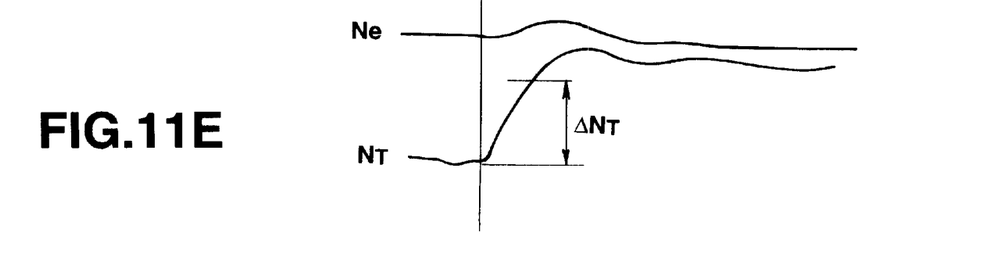

The engine speed Ne indicates a characteristic, as shown in an upper part of FIG. 11E, such that no large variation occurs before and after the range selection.

The turbine speed $N_T$ indicates a characteristic, as shown in a lower part of FIG. 11E, such that the turbine speed $N_T$ is raised immediately after the range selection is carried out but the moderate raising gradient is indicated after the set time duration Tc is passed.

In addition to the advantage described in the first preferred embodiment, the select-shock control apparatus in the case of the second embodiment, the following advantages can be achieved.

That is to say, since the control of the back pressure in the accumulator such that the back pressure of the accumulator is vertically increased up to the relatively low first set pressure Pc immediately after the determination that the range selection from D to N range occurs in order to promote the torque drawn-out and the increase in the turbine speed, thereafter, further vertically increased up to the relatively high second set pressure Pv, thereafter, is decreased moderately by the gradient θ, and, thereafter, is drawn out at the dash (vertically) to zero when the set time duration Ts set for the turbine revolution speed $N_T$ not to provide the select-shock is ended, the control over the torque drawn-out of the low clutch L/C and the increasing speed of the turbine speed $N_T$ permits the assured prevention of the select-shock.

In addition, since the gradient θ by which the back pressure of the accumulator is increased up to the second set pressure Pv and is decreased slowly becomes smaller as the oil temperature becomes high, the prevention of assurance in the select-shock can be assured stably irrespective of the variation in the working oil temperature.

It is noted that the reason that as the oil temperature becomes high, the gradient θ becomes low is that when the oil temperature is low, a hydraulic pressure responsive characteristic is fast and a clutch frictional resistance μ tends to become small.

Other Embodiments

The automatic power transmission to which the select-shock control apparatus according to the present invention is applicable is not limited to that described in the first embodiment. The present invention is also applicable to the select-shock control apparatus which directly controls the drawn-out pressure of an engagement element released when the range selection occurs.

Although, in each of the first and second embodiments, the select-shock control from D range to N range has been described, the present invention is applicable to the control over the drawn-out pressure engagement element released when the range change from R to N range occurs or when a fixed gear range position such as II range or I range to N range occurs.

It is noted that the engine speed (Ne) may be supplied from the engine controller to the A/T controller 20.

It is also noted that the term of at a dash means immediately with no gradient such as denoted by θ or instantaneously like a free fall and the inhibitor switch is included in the other sensors and switches 31 in FIG. 3A.

What is claimed is:

1. A select-shock control apparatus for a vehicular automatic transmission, comprising:
    a range selection determinator programmed to determine whether a range change from a vehicular runing range to a neutral range occurs;
    a friction element to be released when the range change from the vehicular running range to the neutral range occurs; and
    a controller programmed to perform a transient hydraulic pressure control such that a hydraulic pressure discharged from the friction element is reduced to a predetermined pressure level such as to prevent a shock which would occur in the vehicle from occurring when the range change occurs, the rate of the discharging of hydraulic pressure is maintained at a constant level for a time duration at an end of which substantially no vehicular running torque remains applied to the friction element, and, thereafter, an engagement torque developed on the friction element is discharged in a substantially step change to zero without a substantial throttling when the range selection determinator determines that the range change from the vehicular running range to the neutral range occurs.

2. A select-shock control apparatus for a vehicular automatic transmission as claimed in claim 1, which further comprises a hydraulic pressure passage connected to the friction element and an accumulator disposed midway through the hydraulic pressure passage connected to the friction element and wherein the controller includes an accumulator back pressure controller for raising a back pressure of the accumulator to a set pressure level (Pc) during the time duration (Ts) so as to reduce the hydraulic pressure at the friction element to the predetermined pressure level.

3. A select-shock control apparatus for a vehicular automatic transmission as claimed in claim 2, which further comprises a working oil temperature sensor for detecting a temperature of a working oil in the vehicular automatic transmission and wherein the set pressure level (Pc) is varied according to the working oil temperature.

4. A select-shock control apparatus for a vehicular automatic transmission as claimed in claim 2, which further comprises a vehicular engine controller for supplying an engine speed (Ne) to the controller and wherein the set pressure level (Pc) is varied according to the engine speed.

5. A select-shock control apparatus for a vehicular automatic transmission as claimed in claim 2, which further comprises a turbine speed sensor for detecting a turbine speed of a hydrodynamic drive device of the vehicular automatic transmission and wherein the set pressure level (Pc) is varied according to the turbine speed.

6. A select-shock control apparatus for a vehicular automatic transmission as claimed in claim 5, which further comprises an engine controller for supplying an engine speed to the controller and wherein the set pressure level (Pc) is varied according to a difference ($Ne-N_T$) between the engine speed and the turbine speed.

7. A select-shock control apparatus for a vehicular automatic transmission as claimed in claim 3, wherein the set pressure level (Pc) becomes higher as the working oil temperature becomes higher.

8. A select-shock control apparatus for a vehicular automatic transmission as claimed in claim 1, wherein the friction element is a low clutch (L/C) and the vehicular running range is a drive (D) range.

9. A select-shock control apparatus for a vehicular automatic transmission as claimed in claim 1, which further comprises: a hydraulic pressure passage connected to the friction element; an accumulator disposed midway through the hydraulic pressure passage connected to the friction element; and a turbine speed sensor for detecting a speed of a turbine of a hydrodynamic drive device and wherein the controller includes an accumulator back pressure controller for raising a back pressure of the accumulator to a set first pressure level (Pc) during a first time duration (Tc) from a time at which the range selection determinator determines that the range change from the vehicular runing range to the neutral range to promote the discharge of the engagement torque of the friction element and a rise of the turbine speed so as to reduce the hydraulic pressure at the friction element to the predetermined pressure level, thereafter, for raising further the back pressure of the accumulator up to a set second pressure level (Pv) and reducing the back pressure from the set second pressure level (Pv) at a gradient (θ) during a second time duration (Ts–Tc) from a time at which the first time duration (Tc) is ended to a time at which the turbine speed ($N_T$) is reduced to a level such as to provide a negligible level of the select-shock, and, thereafter, discharging the back pressure in a substantially step change to zero when the second time duration (Ts–Tc) is ended.

10. A select-shock control apparatus for a vehicular automatic transmission as claimed in claim 9, which further comprises a temperature sensor for detecting a temperature of a working oil and wherein the gradient (θ) is varied according to the working oil temperature.

11. A select-shock control apparatus for a vehicular automatic transmission, comprising:
    range selection determinator programmed to determine whether a range change from a vehicular running range position to a neutral range occurs;
    a friction element to be released when the range selection from the vehicular running range to the neutral range occurs; and
    controlling means programmed to perform a transient hydraulic pressure control such that a hydraulic pressure discharged from the friction element is reduced to a predetermined pressure level such as to prevent a shock which would occur in the vehicle from occurring when the range change occurs, the rate of the discharging of hydraulic pressure is maintained at a constant level for a time duration at an end of which substantially no vehicular running torque remains applied to the friction element, and, thereafter, an engagement torque developed on the friction element is discharged in a substantially step change to zero without a substantial throttling when the range selection determining means determines that the range change from the vehicular running range to the neutral range occurs.

12. A select-shock control method for a vehicular automatic transmission, the automatic transmission having a friction element to be released when a range change from a vehicular running range to a neutral range occurs, the method comprising the steps of:

determining whether a range change from the vehicular running range to the neutral range occurs;

performing a transient hydraulic pressure control such that a hydraulic pressure discharged from the friction element is reduced to a predetermined pressure level such as to prevent a shock which would occur in the vehicle from occurring when the range change occurs, the rate of the discharging of hydraulic pressure is maintained at a constant level for a time duration at an end of which substantially no vehicular running torque remains applied to the friction element, and, thereafter, an engagement torque developed on the friction element is discharged in a substantially step change to zero without a substantial throttling when the determining step determines that the range change from the vehicular running range to the neutral range occurs.

* * * * *